US 11,195,112 B2

(12) United States Patent
Chee et al.

(10) Patent No.: US 11,195,112 B2
(45) Date of Patent: **\*Dec. 7, 2021**

(54) SYSTEM AND METHOD FOR IDENTIFYING COMPOSITION PREFERENCES

(71) Applicant: International Business Machines Corporation, Armonk, NY (US)

(72) Inventors: Yi-Min Chee, Yorktown Heights, NY (US); Ashish Jagmohan, Irvington, NY (US); Pamela N. Luna, Houston, TX (US); Krishna C. Ratakonda, Yorktown Heights, NY (US); Richard B. Segal, Chappaqua, NY (US); Piyawadee Sukaviriya, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 726 days.

This patent is subject to a terminal disclaimer.

(21) Appl. No.: 15/007,813

(22) Filed: Jan. 27, 2016

(65) Prior Publication Data

US 2017/0116538 A1   Apr. 27, 2017

Related U.S. Application Data

(63) Continuation of application No. 14/979,759, filed on Dec. 28, 2015.

(Continued)

(51) Int. Cl.
*G06N 7/00* (2006.01)
*G06N 3/02* (2006.01)
*G06N 5/02* (2006.01)

(52) U.S. Cl.
CPC ............... *G06N 7/005* (2013.01); *G06N 3/02* (2013.01); *G06N 5/02* (2013.01)

(58) Field of Classification Search
CPC ....... G06N 7/005; G06N 3/02; G09B 19/0092
See application file for complete search history.

(56) References Cited

U.S. PATENT DOCUMENTS 6,370,513 B1 * 4/2002 Kolawa ................. G06Q 30/02
705/15
6,792,412 B1 * 9/2004 Sullivan ............. G06F 17/30648
706/25

(Continued)

OTHER PUBLICATIONS

Varshney, Lav et al. "A Big Data Approach to Computational Creativity" arXiv [Published Nov. 5, 2013] [Retrieved online May 2019] <URL: https://arxiv.org/abs/1311.1213> (Year: 2013).*

(Continued)

*Primary Examiner* — Ann J Lo
*Assistant Examiner* — Fen Christopher Tamulonis
(74) *Attorney, Agent, or Firm* — Cantor Colburn LLP; Joseph Petrokaitis

(57) ABSTRACT

According to embodiments, methods, systems, and computer program products are provided for receiving one or more input compositions comprising one or more materials, assigning a material vector to each material, learning, for each of the input compositions, a composition vector based on the material vectors of the materials that form each composition, assigning predicted rating values having a confidence level to each of the composition vectors, selecting a composition to be rated based on the confidence levels, presenting the selected composition to be rated to a user, receiving a user rating for the composition to be rated; adjusting the predicted rating values and confidence levels of the composition vectors that have not been rated by the user, and generating a predictive model to predict a user's (Continued)

ratings for compositions when confidence levels of each composition vector is above a predetermined threshold value.

6 Claims, 4 Drawing Sheets

Related U.S. Application Data

(60) Provisional application No. 62/246,896, filed on Oct. 27, 2015.

(56) References Cited

U.S. PATENT DOCUMENTS

| | | | | |
|---|---|---|---|---|
| 2009/0076997 | A1* | 3/2009 | Ducheneaut | G06Q 30/02 706/47 |
| 2010/0138443 | A1* | 6/2010 | Ramakrishnan | G06F 17/30038 707/769 |
| 2012/0303559 | A1* | 11/2012 | Dolan | G06N 20/00 706/12 |
| 2013/0149676 | A1 | 6/2013 | Tokuda et al. | |
| 2013/0149679 | A1* | 6/2013 | Tokuda | G09B 19/0092 434/127 |
| 2014/0089321 | A1 | 3/2014 | Engel et al. | |
| 2015/0059438 | A1 | 3/2015 | Varshney et al. | |
| 2015/0066386 | A1 | 3/2015 | Varshney et al. | |
| 2015/0220592 | A1 | 8/2015 | Robberechts et al. | |
| 2015/0235136 | A1* | 8/2015 | Dillon | G06N 5/04 706/46 |
| 2015/0294225 | A1* | 10/2015 | Takei | G06N 5/04 706/11 |
| 2016/0103839 | A1* | 4/2016 | Altaf | G06F 3/0482 707/723 |
| 2017/0116518 | A1 | 4/2017 | Chee | |

OTHER PUBLICATIONS

Varshney, Kush et al. "Optimal Grouping for Group Minimax Hypothesis Testing" arXiv [Published Jul. 24, 2013] [Retrieved May 2019] <URL: https://arxiv.org/abs/1307.6512> (Year: 2013).*
Qian et al. "Fast Pairwise Query Selection for Large-Scale Active Learning to Rank" IEEE ICDM'13 [Published 2013] [Retrieved Online Sep. 2019] <URL: https://ieeexplore.ieee.org/stamp/stamp.jsp?tp=&arnumber=6729545> (Year: 2013).*
Viappiani et al. "Regret-based Optimal Recommendation Sets in Conversational Recommender Systems" RecSys'09 [Published 2009] [Retrieved Online Sep. 2019] <URL: https://dl.acm.org/citation.cfm?id=1639732> (Year: 2009).*
Qian et al. "Learning Multiple Relative Attributes with Humans in the Loop" IEEE TIP vol. 23. No. 12 [Published 2014] [Retrieved Online Sep. 2019] <URL: https://ieeexplore.ieee.org/stamp/stamp.jsp?tp=&arnumber=6940304> (Year: 2014).*
Amaldi, Edoardo et al. "A distance-based point-reassignment heuristic for the k-hyperplane clustering problem" EJOR vol. 227 Is. 1 [Published 2013] [Retrieved Jan. 2020] <URL: https://www.sciencedirect.com/science/article/pii/S037722171200690X> (Year: 2013).*
B. Demir and L. Bruzzone, "A Novel Active Learning Method in Relevance Feedback for Content-Based Remote Sensing Image Retrieval," in IEEE Transactions on Geoscience and Remote Sensing, vol. 53, No. 5, pp. 2323-2334, May 2015, doi: 10.1109/TGRS.2014.2358804. (Year: 2015).*
Simon Tong and Edward Chang. 2001. Support vector machine active learning for image retrieval. In Proceedings of the ninth ACM international conference on Multimedia (MULTIMEDIA '01). Association for Computing Machinery, New York, NY, USA, 107-118. DOI:https://doi.org/10.1145/500141.500159 (Year: 2001).*
Mingkun Li and I. K. Sethi, "Confidence-based active learning," in IEEE Transactions on Pattern Analysis and Machine Intelligence, vol. 28, No. 8, pp. 1251-1261, Aug. 2006, doi: 10.1109/TPAMI.2006.156. (Year: 2006).*
Warmuth et al. "Active Learning with Support Vector Machines in the Drug Discovery Process" J. Chem. Inf. Comput. Sci. 2003, 43, 2, 667-673 Publication Date: Feb. 12, 2003 https://doi.org/10.1021/ci025620t (Year: 2003).*
T. V. Ashwin, N. Jain and S. Ghosal, "Improving image retrieval performance with negative relevance feedback," 2001 IEEE International Conference on Acoustics, Speech, and Signal Processing. Proceedings (Cat. No.01CH37221), 2001, pp. 1637-1640 vol. 3, doi: 10.1109/ICASSP.2001.941250. (Year: 2001).*
Wei Zeng, Ming-Sheng Shang and Tie-Yun Qian, "Useful acquiring ratings for collaborative filtering," 2009 IEEE Youth Conference on Information, Computing and Telecommunication, 2009, pp. 483-486, doi: 10.1109/YCICT.2009.5382452. (Year: 2009).*
A. Karatzoglou, et al.,"Multiverse Recommendation: N-dimensional Tensor Factorization for Context-aware Collaborative Filtering", ACM Recommender Systems, 2010, p. 1-8.
C-Yuen Teng, et al.,"Recipe recommendation using ingredient networks", Proceedings of the 4th Annual ACM Web Science conference, May 21, 2012, p. 1-10.
J. Freyne, et al.,"Recommending Food: Reasoning on recipes and ingredients", Adaptation, and personalization, Springer Berlin Heidelberg, 2010, p. 1-5.
P. Forbes, et al.,"Content-boosted Matrix factorization for recommender systems: experiments with Recipe recommendation", Proceedings of the fifth ACM conference on recommender systems, Oct. 23-27, 2011, p. 1-4.
Q. Zhang, et al.,"Back to the Future:Knowledge Light Case Base Cookery", Conference papers, Jan. 1, 2008, p. 1-11.
S. Berkovsky, et al.,"Group-Based recipe recommendations: analysis of data aggregation strategies", Proceedings of the fourth ACM confernce on recommender systems, Sep. 26-30, 2010, p. 1-8.
Y. Guo, et al.,"Optimistic Active Learning using Mutual Information" IJCAI, 2007, p. 1-7.
Mikolov, et al., "Distributed Representations of Words and Phrases and their Compositionality," Advances in neural information processing systems. 2013; 9 pages.
Mikolov, et al., "Efficient Estimation of Word Representations in Vector Space," arXiv preprint arXiv:1301.3781 Sep. 7, 2013; 12 pages.
Mikolov, et al., "Exploiting Similarities among Languages for Machine Translation," arXiv preprint arXiv:1309.4168 (2013); 10 pages.
Pennington, et al., "GloVe: Global Vectors for Word Representation," Proceedings of the 2014 Conference on Empirical Methods in Natural Language Processing (EMNLP), pp. 1532-1543, Oct. 25-29, 2014; 12 pages.
Pinel, et al., "A Culinary Computational Creativity System," Chapter 16: Computational Creativity Research: Towards Creative Machines, vol. 7 of the series Atlantais Thinking Machines; Dec. 5, 2014; pp. 327-346.

* cited by examiner

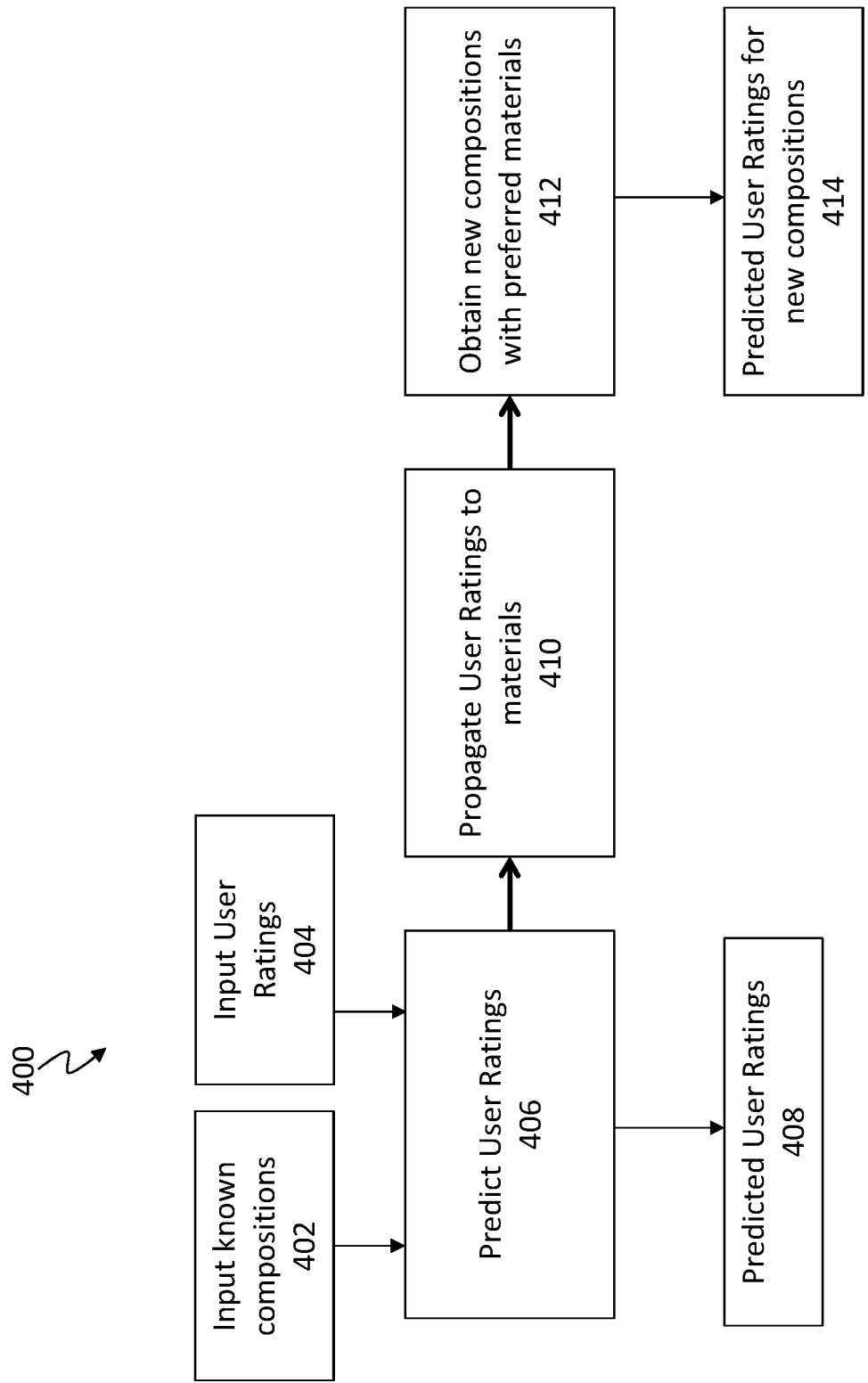

SYSTEM AND METHOD FOR IDENTIFYING COMPOSITION PREFERENCES

DOMESTIC PRIORITY

This application is a continuation of U.S. patent application Ser. No. 14/979,759, entitled "SYSTEM AND METHOD FOR IDENTIFYING COMPOSITION PREFERENCES," filed Dec. 28, 2015, which claims priority to U.S. Provisional Application No. 62/246,896, entitled "SYSTEM AND METHOD FOR IDENTIFYING COMPOSITION PREFERENCES," filed Oct. 27, 2015, which is incorporated herein by reference in its entirety.

BACKGROUND

The present disclosure relates generally to systems and methods for material compositions and, more specifically, to systems and methods for using vector space and neural networks to identify composition preferences.

Generating material compositions based on preferences is traditionally difficult, particularly when attempting to match various characteristics and/or properties of various materials while also identifying preferences of a person. Expert knowledge in a particular domain (e.g., food, structural materials, etc.) in combination with a user rating system may be required to enable selecting a preferred composition and/or generating new compositions from known materials and/or components. A user's preferences may be used to rate various compositions, and based on this additional compositions may be recommended. Significant data may be required to provide accurate recommendations that may actually fit within a user's preferences.

SUMMARY

According to embodiments, methods, systems, and computer program products are provided to learn a user's preferences regarding compositions, including receiving, by a processor, one or more input compositions, each input composition comprising one or more materials; assigning a material vector to each of the materials; learning for each of the one or more input compositions a composition vector based on the material vectors of the materials that form each composition; assigning a predicted rating value to each of the composition vectors, each predicted rating value having a confidence level; selecting a composition to be rated based on the confidence levels of the composition vectors; presenting the selected composition to be rated to a user; receiving a user rating for the composition to be rated; adjusting the predicted rating values and confidence levels of the composition vectors that have not been rated by the user; and generating a predictive model to predict a user's ratings for compositions when confidence levels of each composition vector is above a predetermined threshold value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a flow process implementing embodiments provided herein to provide a predicted user rating for a new composition.

DETAILED DESCRIPTION

Figure 1:
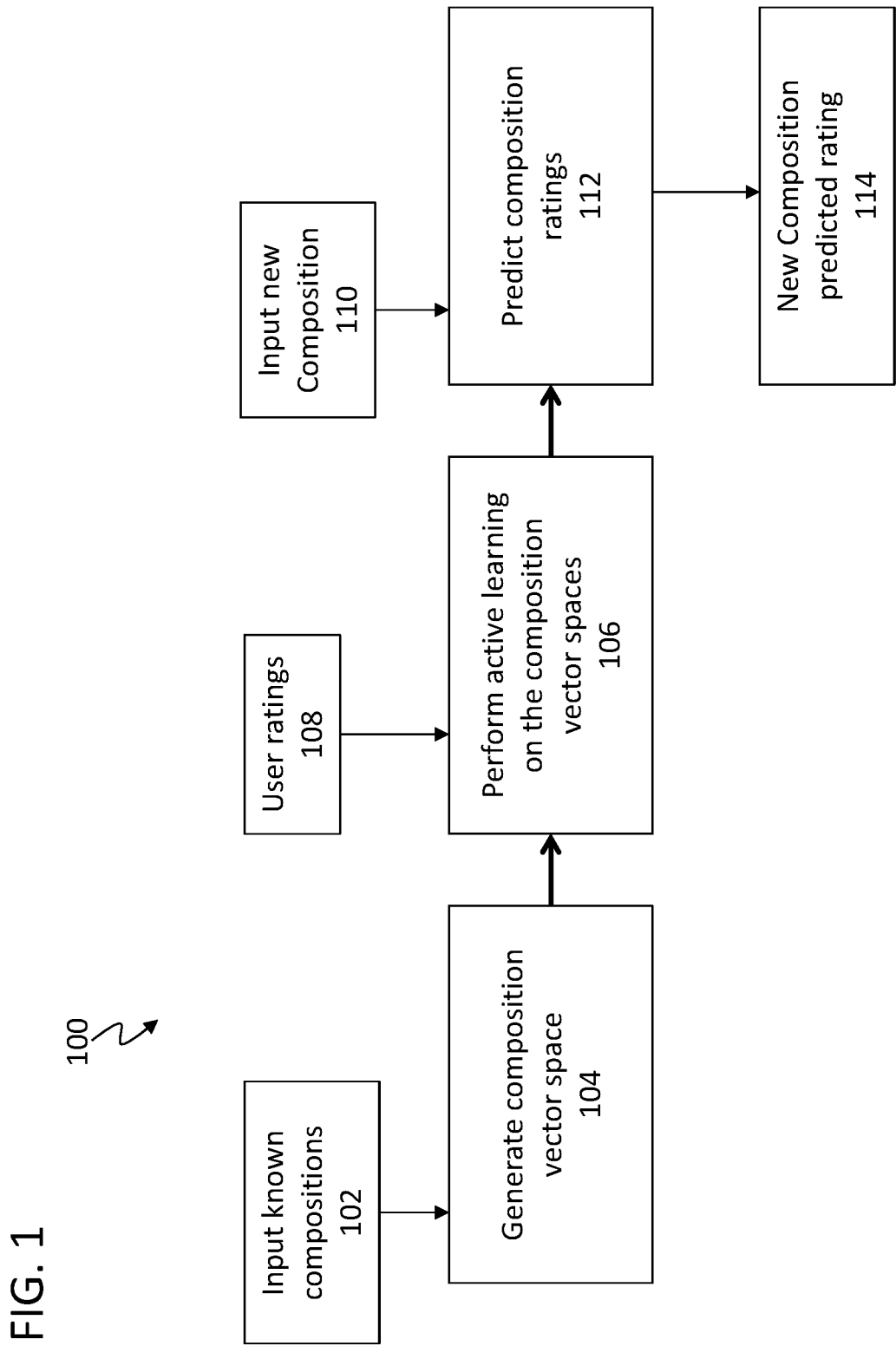
FIG. 1 is a schematic illustration of training or system learning in accordance with an embodiment of the present disclosure.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments will be described with reference to the attached drawings.

Provided herein are systems, methods, and processes for providing interactive composition recommendations to a user, such as recipes and dishes, although other compositions are considered by the present disclosure. For example, the inputs to systems provided herein may be one or more sets of recipes and user responses to a series of preference queries. The system may then output predicted user ratings for non-rated compositions. That is, based on the input information, the system may predict a rating that a user would apply to a particular composition if the user had directly rated the composition.

In various embodiments provided herein, the system includes a composition vector representation framework, which utilizes material vectors to build an embedded vector model for compositions that include the materials (e.g., a recipe space based on ingredient vectors). An active learning framework is provided that uses the structure of the composition space to adaptively determine the optimal compositions for the user to label and/or rank. A recipe recommendation framework is included to analyze data points labeled or ranked during the active learning process to recommend other or new compositions to the user.

Advantageously, embodiments provided herein may predict user preferences without an existing database of users and ratings, provide a method of learning composition preferences with minimal user input, and/or the systems and methods can be applied to various domains.

Turning to FIG. 1, an overview of systems and processes provided herein is shown. The overview is a model process 100 that is used to achieve embodiments of the present disclosure. As shown, at block 102, a data set comprising one or more compositions are input into a system wherein each of the one or more compositions is embedded into a vector space. The embedding is performed at block 104, wherein each known composition input at 102 is embedded with a unique vector space. That is, in some embodiments, each composition may be assigned or have a composition vector, and the aggregate of the composition vectors defines a vector space, such as a composition vector space.

At block 106, active learning is performed. The active learning includes having a user rate one or more of the compositions that have been assigned vectors in the vector space at block 104. That is, at block 108, a user may provide a ranking on one of the input compositions (from 102) that has been assigned a vector (from 104). The rating from the user may then be used to enable the system to learn the user's preferences by correlating the user's ratings with the vector space information assigned to the compositions.

For example, given a new composition (having a vector) input at block 110 a system that has performed active learning at block 106 can predict a user composition rating of the new composition input from block 110 at block 112. At block 114, the system may output a predicted rating for the new composition input at block 110 based on the active learning performed at block 106.

The assigning and/or generating of the composition vector will now be described. In accordance with one non-limiting embodiment, the system may construct composition vectors using information about the materials that compose the compositions. That is, in some embodiments, the system may separate each input composition into the discrete materials that are used to form the composition.

In generating composition vectors, the composition vector may be based on and/or composed of a combination of vectors that are used for each material of the composition. For example, each material may be provided with a specific value or vector that is unique, i.e., a material vector. For a composition, the composition vector may be formed from each of the material vectors of the materials that are present in the composition.

In one non-limiting example of this, a bag-of-materials approach may be used. In this approach, each potential composition vector may have a length equal to a total number of possible materials. For example, in a generic, simple example, if a group of compositions is formed from fifty possible materials, each composition of this group will have a length of fifty. A specific composition within the group will be assigned a vector with length that is equal to a length of all of the materials, with the value of the vector indicating the materials constituting the composition. Thus, in the above example, if a composition is formed form the first, tenth, and twenty third materials, the composition vector may be represented by a value with a "1" located in the first, tenth, and twenty third positions, and a "0" may be located in each of the other forty-seven parts of the composition vector. As such, in this approach, each composition will have a unique composition vector based on the materials that make up the composition. A further step in the generation of the composition vectors, in this approach, may include matrix factorization to product lower dimensional vectors for each composition.

In another non-limiting example, the composition vector may be constructed using material vectors. In this approach, an average vector of each material in a composition may be determined, with each material equally weighted. By using the average vector of each material in a composition, the composition vector may be formed based on each material of the composition. This process may be performed, for example, similar to that shown and described in co-pending application U.S. patent application Ser. No. 14/974,595 entitled "SYSTEM AND METHOD FOR GENERATING MATERIAL COMPOSITIONS" filed on Dec. 18, 2015, which is incorporated herein by reference in its entirety. In some embodiments, the material vectors may be learned by training an artificial neural network. For example, in some embodiments, an artificial neural network may receive information regarding a first material composition and generate material vectors for each vector that is a part of the first material composition. Then, the artificial neural network may receive information regarding another or second material composition having at least one material in common, and thus the material vector may be learned, e.g., a weighting may be altered by the information of the second material. Thus, in some embodiments, the material vectors may be learned by training an artificial neural network wherein inputs and outputs of the artificial neural network may include one or more materials from a prior example composition. In the above described non-limiting configuration the first material composition is a prior example composition that is used for generating and learning the material vectors.

In another non-limiting example, the composition vector may be constructed using an ensemble normalized material weight. In this approach, the average of the vectors for each material in a composition may be weighted, rather than averaged as provided in the prior approach. For example, a material vector weighting may be provided by determining a distribution of a material's percentage inclusion across a full set or group of compositions. That is, a material vector may be weighted based on how often and/or in what quantity the specific material appears in the group of compositions. Alternatively, a normalization of percent inclusion of the material in a specific composition may be done by using distribution parameters (e.g., mean, variance, etc.). From this, each material may be assigned a weighted vector, and the composition vector for each composition may be based on and/or constructed from the weighted material vectors. As will be appreciated by those of skill in the art, normalization factors and/or offsets may be used to provide usable and/or comparable composition vectors. With each material assigned a normalized material vector, a composition vector may be defined by a sum of all materials that form the specific composition.

In another non-limiting approach, an inverse composition frequency process may be used to weigh material vectors that are used to form composition vectors. For example, in such an approach, common materials in a group of compositions may be decreased in weight, while other materials may be increased in weight because they are uncommon. In such an approach, in one example, a material vector may be determined based on a total number of materials in the composition group and a log of the total number of materials divided by the number of compositions that include the specific material may be found. As such, an inverse relationship may be used to weight material vectors, which may then be used and/or combined to generate composition vectors.

As will be appreciated by those of skill in the art, there are multiple approaches and ways to assign compositions composition vectors, and the present disclosure is not limited to the various above described approaches. That is, the above described approaches are provided as examples and other methodologies may be used without departing from the scope of the present disclosure.

As shown in FIG. 1, after the compositions are assigned composition vectors, active learning may be performed. The active learning may be performed in various methodologies. However, one example will now be provided. In the example embodiment, the system may select one composition and present it to a user (in the form of a rating system wherein the user may rate the composition). Based on the user's rating, the system may then select the next optimal composition based on the composition vectors. The process may then be repeated for another composition. Once enough initial compositions have been rated, the system may then select a new composition for rating that will optimize some statistical aspect of the learning. That is, the system is building a prediction model based on user input, and during the learning process the system will select compositions to be ranked by the user based on an optimization that may be achieved by a user rating the selected composition.

For example, the system, after having a number of initial ratings, may select a new composition for rating that, based on the user's rating or response, may improve the system's confidence level, variance, error, etc. That is, for example, given fifty initial compositions, the system may have a user rate one to three compositions initially. Based on the initial ratings, the system may select the next composition for rating that will have a statistically significant impact on the overall system and the system's ability to make a prediction for the user. The system may continue to prompt a user to rate compositions until an acceptable confidence or error rate has been achieved and/or a threshold number of compositions have been rated. That is, the system may be configured to query a user until a predetermined limit has been reached, with the limit based on a confidence level, error level, and/or preset number of queries.

Figure 2:
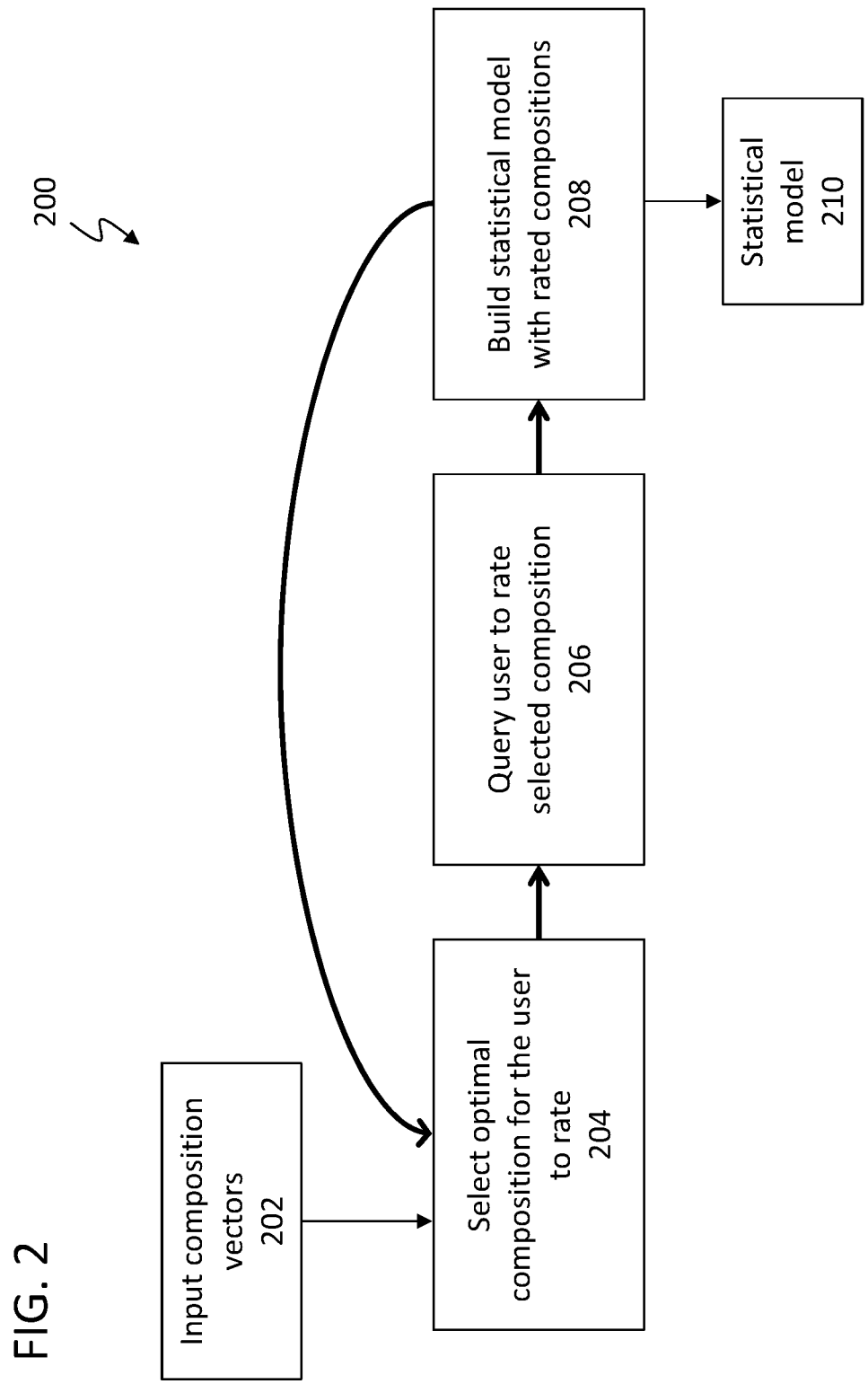
FIG. 2 is a flow process for generating a statistical model for predicting user preferences in accordance with an embodiment of the present disclosure.

Turning to FIG. 2, an example illustration of the above described active learning process is shown. In the active learning process 200, at block 202, the composition vectors may be provided to the system. That is, a system may be loaded with one or more compositions that are to be rated by a user. The input compositions may be a complete group of composition that form a composition space the compositions fill, or the input compositions may be one or more compositions that make up a subset of compositions that fill a composition space. As used herein, a composition space is a set of compositions that are formed from a specific set of materials. For example, a composition space may be food, with each material being an ingredient, and each composition being a recipe. In this example, a number of recipes may be input into the system, with the composition vectors based on material or ingredient vectors. The recipes may form a set of recipes of a particular cuisine or may be randomly selected recipes, or may be a group of recipes that are available at a particular restaurant, etc.

At block 204, the active learning system will select one composition for a user to rate. The first selected composition may be randomly selected or may be selected based on some predetermined criteria. For example, the first selected composition may be a representative composition of a cluster within the composition space. A cluster may be a group of compositions that are similar, relatively similar, and/or have one or more materials or other characteristics in common.

At block 206, the system will present the composition selected at block 204, and query the user to rate the selected composition. The rating may take any number of forms. For example, the system, which may be an electronic device having a user interface, may present the composition to the user in graphical, image, and/or descriptive form, and ask the user to provide a numerical rating that represents the user's preference (e.g., like or dislike) of the particular composition.

Taking the user's rating at block 208 into account, the system may update and/or build a statistical model of the user's preferences. The system will check to see if a predefined number of inquiries have been made and/or a specific/predefined statistically significant accuracy has been achieved. If the system determines that additional queries must be made, the process will return to block 204 and select a new composition to be rated at block 206, and the statistical model is then further updated. However, if the system determines that the statistical model for predicting the user's preferences is accurate enough (which is predetermined based on, e.g., the above described criteria), the system may output a statistical model at block 210.

Figure 3:
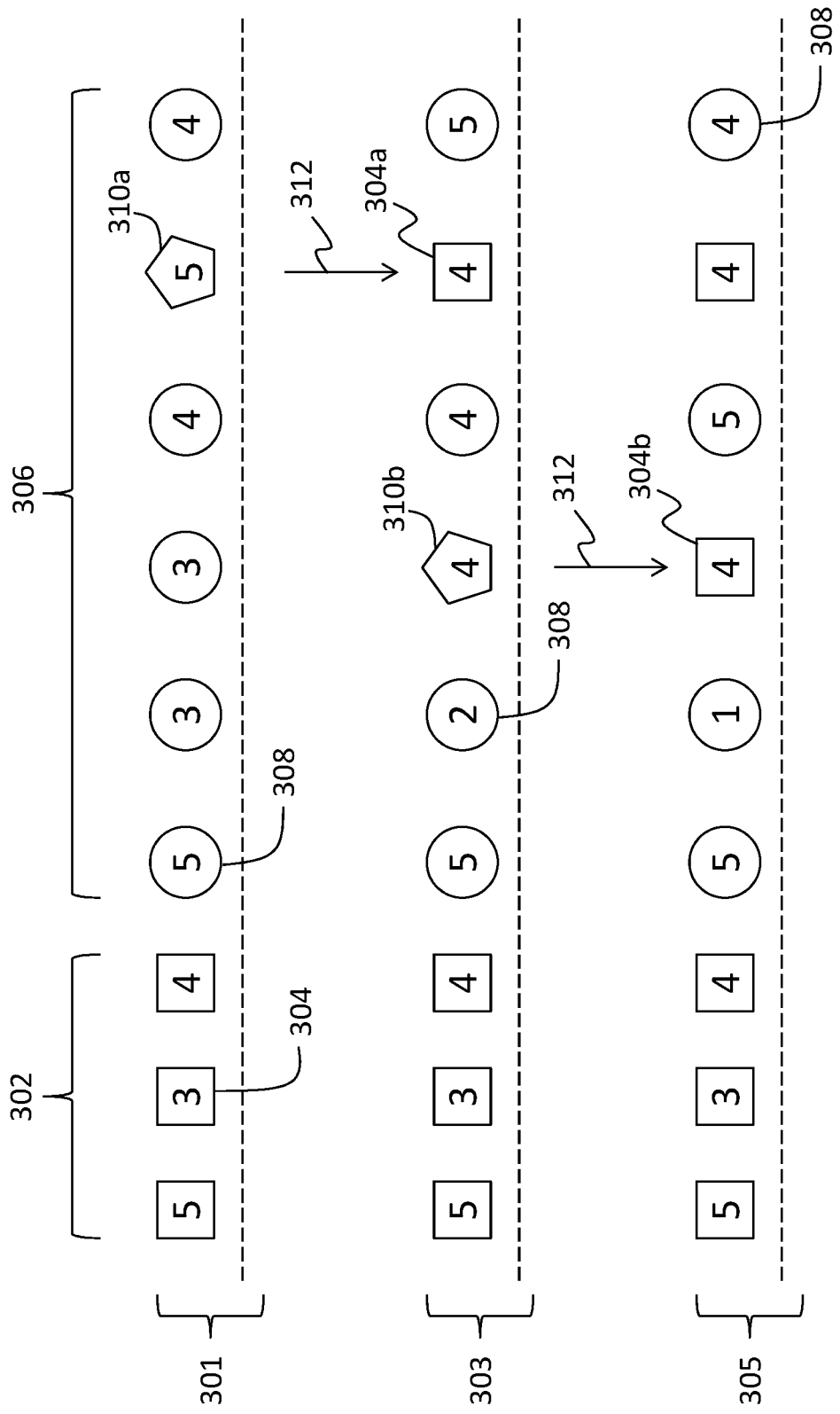
FIG. 3 is a schematic diagram of a system and process thereof in accordance with an embodiment of the present disclosure.

Turning now to FIG. 3, an example of an active learning process in accordance with an embodiment of the present disclosure is shown. The active learning process may include a composition group formed of the total of compositions which are element of the data set 302 and elements of the data set 306, as described below.

The active learning process may begin by performing an initial training to train a preset initial data set 302. The initial data set 302 may be generated by querying a user regarding predetermined or randomly selected compositions obtained from the group of compositions. Because the initial data set 302 includes compositions rated by a user, the initial data set 302 indicates the user's ratings 304 (e.g., 5, 3, 4) and are shown in squares, indicating a known rating 304. Thus, the initial data set 302 may be formed of one or more known ratings 304. A known rating 304 is a composition having high (e.g., close to 100%) confidence because the user directed and actively rated the particular composition. The other compositions 306 of the composition group are shown in circles, indicating a predicted rating 308. The other compositions 306 are all compositions from the composition group that are not part of the initial data set 302.

In some embodiments, the initial inquiries to generate the initial data set 302 may be based on cluster-based querying. For example, the compositions of the group of compositions may be clustered based on composition vectors (as described above). A clustering algorithm may be employed, as known in the art, such as Gaussian Mixture Model (GMM) or k-means. The initial queried compositions may be selected based on a closeness to a centroid of a cluster, and may be responsive to, for example, cluster size, cluster distance from a prior query, and/or randomly selected (or a random element with other criteria).

In FIG. 3, as shown, the known ratings are shown in squares, and the unknown/unrated compositions from the composition group are shown in circles. That is, ratings that are squared are determined by the user based on an inquiry, and all other composition ratings are unknown because the system has not queried the user regarding the particular composition(s).

Based on the initial data set 302, the system may perform a first prediction 301. That is, the system may take the known ratings 304 and assign predicted ratings 308 to all other compositions 306 that are unknown. With the first prediction 301, the system may select a first selected composition 310a (indicated in pentagon) to be used as the next query to the user. That is, given the initial data set 302 and the predicted values of the first prediction 301, the system selects a composition that has an unknown rating and presents that composition to the user.

As shown, a second prediction 303 may be generated by the system, based on a user rating 312 which is input from the user for the first selected composition 310a. As shown, because the user inputs a rating for the first selected composition 310a, the particular composition becomes a known rating 304a. Further, as shown, the other compositions 306 that have unknown/predicted ratings 308 may change based on the user's rating of the first selected composition 310a. As such, some of the predicted ratings 308 of the other compositions 306 may change.

The process may then be repeated, to generate a third prediction 305. That is, as shown, the system may select a second selected composition 310b (indicated in a pentagon). A user rating may then be input for the second selected composition 310b, and that particular composition may be assigned the user's rating as a known rating 304b. Again, the other unknown/predicted values 308 may change from the second prediction 303 to the third prediction 305. In this manner, the system may gradually improve the confidence the system has in each unknown/predicted value 308.

Each unknown/predicted composition rating will have a confidence. That is, each time a new prediction is made, the system may become more or less confident in a particular predicted rating. Thus, for example, referring to the first column of unknown/predicted values 308 shown in FIG. 3, the predicted value stays at "5" during each subsequent prediction. In some embodiments, this may indicate a high level of confidence in the predicted value. Other predicted values may have less confidence for the predicted rating. However, with each subsequent prediction, the system may become more confident in each individual remaining unknown/predicted rating. Accordingly, the goal of each inquiry is to improve the overall confidence, and in some embodiments, the goal is provide the highest level of confidence in the fewest number of inquiries.

As the confidence for each and every composition improves, or a specific number of inquiries are made, the system may generate a model for predicting a user's preferences based on composition vectors. Thus, even given a new composition that was not part of the composition group used for the active training shown in FIG. 3, the system may make a prediction of the user's rating based solely on the composition vector of the new composition and using the composition vector to make a prediction.

In the above described process, each selected composition from the unknown/predicted composition may be selected based on cluster-based querying (as described above) or may be based on uncertainty-based querying. In uncertainty-based querying, the system may construct a kernel M-ary classifier from ratings obtained responsive to prior or previous queries, such as a Support Vector Machines (SVM) classifier, although L1, redundancy vector machines, etc. may be used without departing from the scope of the present disclosure.

In this process, the system may find a distance of each unknown/predicted composition from a separating hyperplane. The process may then alternate between classification uncertainty and knowledge uncertainty. For example, using classification uncertainty, the system may select the next selected composition based on a small distance between a predicted value and a known value, e.g., points with small distance to one or more specific hyper-planes. For example, a hyper-plane separating compositions with ratings of 1 and compositions with ratings of 5. Alternatively, when using knowledge uncertainty, a selected unknown/predicted rating composition may be selected based on a large distance to all (or a subset of) hyper-planes. In such approaches, a max-min over hyper-plane distance may be determined, and the next selected unknown/predicted rating composition may be made on such determination.

As noted, the system and process may be configured to make a specific number of queries and/or may be configured to make queries until a predetermined threshold is met. For example, given a set of fifty compositions, the system may be configured to make seven queries, as this may be sufficient to have a high level of confidence in future predictions. The number of queries may be based in part on the number of materials that are present in the group of compositions. Alternatively, or in combination with a set number of inquiries, the system may be configured to make queries until every prediction has a minimum confidence level, maximum error in prediction, etc. For example, each predicted rating may have a confidence level value that indicates how confident the system is that the prediction is accurate (which may be based on material vectors and/or composition vectors). The system may be configured to ensure that every predicted value has a specific confidence level, and if even one predicted value is below the predetermined confidence level, the system will continue to make additional queries to achieve the desired confidence level.

Once the system has completed the active learning, a statistical model will be generated (e.g., block 210 of FIG. 2). The statistical model may be used to predict ratings for all compositions in a composition space, even compositions that were not part of the group of compositions used during active learning. Accordingly, the system may make predictions of a user's preferences or ratings for any composition that is part of the composition space. That is, given a new composition having a composition vector, the system may apply the statistical model to the vector to predict the rating a user would apply to the new composition. This may be true of synthesized compositions that technically do not exist, e.g., a system was used to prepare or generate a new hypothetical composition and this new composition is assigned a composition vector that can use analyzed using the statistical model to generate a user predicted rating.

For example, turning to FIG. 4, after the processes described with respect to FIGS. 2 and 3, a system may use the statistical model to predict the ratings of unlabeled, new, and/or unidentified compositions. A process 400 may be used with inputs of known compositions 402 and user ratings 404 that are used to perform active learning for predicting user ratings 406. The direct output of such a process may be a set of predicted user ratings 408, which may be applied to known compositions, including, but not limited to, the compositions of the actively learning that were not specifically queried about with the user.

Further, the system may propagate the user ratings to the materials that form the compositions to generate user ratings for materials 410. Thus, given any set of materials, the system may use the composition vectors and/or material vectors to make a prediction of a user rating and preference. That is, the system may perform post-processing of composition ratings (e.g., predicted ratings 408 or user ratings 404) to predict material ratings (e.g., predict an ingredient rating based on a user's recipe ratings).

The system may then use the predicted ratings to obtain a new composition 412 that includes preferred materials of the specific user. For example, the system may select a number of new compositions with predicted high ratings of the user, and then output the new compositions with predicted ratings 414 such that a user may select one of the new compositions with a high level of confidence that they will prefer the new composition.

Accordingly, advantageously, as provided herein, systems and methods for learning a user's preferences are provided in an interactive and adaptive methodology. For example, suggestions for compositions of materials may be presented to a user in a user interface of a device, such as a computer, smartphone, tablet, or other device having a user interface. The process includes learning a model for compositions of materials from past examples, where the model includes mapping materials to signature or unique vectors in a vector space. Further, for each composition, a composition vector may be generated from the constituent material vectors. Then, each composition vector may be mapped to a predicted rating of a user. Based on the predicted ratings, the system may suggest a composition to the user to rate, with the suggestion responsive to an uncertainty or confidence of the predicted rating of the composition. The mapped predicted ratings may then be modified response to the user's rating of the presented or suggested composition to be rated. This may be repeated for multiple suggested compositions such that a confidence in the predicted ratings for all compositions of a group is at a certain, predetermined level, or the uncertainty is lower than a predetermined threshold.

The substitutions, modifications, and/or transformations provided herein may be performed responsive to input constraints on one or more of composition cost, regulatory constraints, and/or composition function. That is, in various embodiments, the constraints may not only be limited to available resources, but rather, any number of factors may be used to influence the system to perform and select a substitution for a material. For example, with respect to food recipes, allergies of a may be a constraint, limiting various recipes—yet a desire to have something similar to the food that the user is allergic to. In the world of structural materials, it may be governed by law that certain materials or compositions may not be able to be used. As such, a criteria or constraint may be based on such considerations.

Further, in some embodiments, the raw materials used in composition generation are provided during training as encrypted values, or are otherwise concealed.

As described above, the compositions may be food recipes, and the materials may be ingredients (or food). In such instances, the composition may be additionally responsive to cuisine type, recipe type, and dietary restrictions, among other requirements.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A computer implemented method to learn a user's preferences regarding compositions, the method comprising:

receiving, by a processor, one or more input compositions, each input composition comprising one or more materials, the one or more input compositions comprising a subset of a composition space;

assigning a material vector to each of the materials, wherein the material vectors are learned by training an artificial neural network;

learning for each of the one or more input compositions a composition vector based on the material vectors of the materials that form each composition;

assigning a predicted rating value to each of the composition vectors, each predicted rating value having a respective confidence level;

selecting an initial composition to be rated by a user, the initial composition selected based on a closeness to a centroid of a first cluster within the composition space;

presenting the initial composition to be rated to the user;

receiving a user rating for the initial composition;

adjusting the predicted rating values and respective confidence levels of the composition vectors that have not been rated by the user based on the received user rating for the initial composition;

performing an iterative process until every predicted rating achieves a minimum confidence level, wherein performing the iterative process comprises:

comparing, for each predicted rating value, the respective confidence level to the minimum confidence level;

in response to determining that at least one confidence level is not above the minimum confidence level, selecting a next composition to be rated by the user, the next composition selected to increase the confidence level of the predicted rating values in the fewest number of inquiries;

presenting the selected next composition to be rated to the user;
receiving a second user rating for the selected next composition; and
adjusting the predicted rating values and respective confidence levels of the composition vectors that have not been rated by the user based on the received user rating for the selected next composition;
building a predictive model to predict the user's ratings for compositions based on the predicted rating values and confidence levels of the composition vectors;
receiving a constraint identifying a first material;
responsive to receiving the constraint, determining a substitute material for the first material based on the predictive model; and
recommending a new composition comprising the substitute material to the user.

2. The system of claim 1, wherein inputs and output of the artificial neural network include one or more materials from a prior example composition.

3. The computer implemented method of claim 1, wherein the composition vector is learned based on the material vectors of respective materials of respective compositions and proportions of the materials within the respective compositions.

4. The computer implemented method of claim 3, wherein ensemble-normalized proportion weights are computed for each material.

5. The computer implemented method of claim 4, wherein the ensemble-normalized weights are responsive to at least one of a distribution of a material percentage of the material within a group of compositions or a normalization of a material percentage of the one or more materials within a single composition by at least one distribution parameter.

6. The computer implemented method of claim 1, wherein the materials are ingredients and the compositions are recipes.

* * * * *